US008239496B2

(12) United States Patent  (10) Patent No.: US 8,239,496 B2
Peterson et al.  (45) Date of Patent: Aug. 7, 2012

(54) SYSTEMS AND METHODS FOR DOCUMENT MANAGEMENT TRANSFORMATION AND SECURITY

(75) Inventors: Donald G. Peterson, Kirkland, WA (US); Duane E. Wald, Kent, WA (US); Andrew D. McCabe, Indianola, WA (US)

(73) Assignee: DocuSign, Inc., Seattle, WA (US)

( * ) Notice: Subject to any disclaimer, the term of this patent is extended or adjusted under 35 U.S.C. 154(b) by 119 days.

(21) Appl. No.: 12/724,147

(22) Filed: Mar. 15, 2010

(65) Prior Publication Data

US 2010/0287260 A1  Nov. 11, 2010

Related U.S. Application Data

(60) Provisional application No. 61/160,237, filed on Mar. 13, 2009.

(51) Int. Cl.
*G06F 15/16* (2006.01)
(52) U.S. Cl. .......................................... 709/219; 709/200
(58) Field of Classification Search .......... 709/200–203, 709/217–227, 228
See application file for complete search history.

(56) References Cited

U.S. PATENT DOCUMENTS

| | | | |
|---|---|---|---|
| 5,220,675 A | 6/1993 | Padawer et al. |
| 5,222,138 A | 6/1993 | Balabon et al. |
| 5,337,360 A | 8/1994 | Fischer |
| 5,390,247 A | 2/1995 | Fischer |
| 5,465,299 A | 11/1995 | Matsumoto et al. |
| 5,544,255 A | 8/1996 | Smithies et al. |
| 5,553,145 A | 9/1996 | Micali |
| 5,615,268 A | 3/1997 | Bisbee et al. |
| 5,629,982 A | 5/1997 | Micali |
| 5,689,567 A | 11/1997 | Miyauchi |
| 5,748,738 A | 5/1998 | Bisbee et al. |
| 5,813,009 A | 9/1998 | Johnson et al. |
| 5,872,848 A | 2/1999 | Romney et al. |
| 5,898,156 A | 4/1999 | Wilfong |
| 6,021,202 A | 2/2000 | Anderson et al. |
| 6,085,322 A | 7/2000 | Romney et al. |
| 6,119,229 A | 9/2000 | Martinez et al. |
| 6,128,740 A | 10/2000 | Curry et al. |
| 6,185,683 B1 | 2/2001 | Ginter et al. |
| 6,199,052 B1 | 3/2001 | Mitty et al. |
| 6,210,276 B1 | 4/2001 | Mullins |
| 6,289,460 B1 | 9/2001 | Hajmiragha |
| 6,321,333 B1 | 11/2001 | Murray |
| 6,327,656 B2 | 12/2001 | Zabetian |
| 6,367,010 B1 | 4/2002 | Venkatram et al. |
| 6,367,013 B1 | 4/2002 | Bisbee et al. |
| 6,470,448 B1 | 10/2002 | Kuroda et al. |
| 6,584,466 B1 | 6/2003 | Serbinis et al. |

(Continued)

OTHER PUBLICATIONS

Borozdin, "DocuSign Connect Service Guide Version 1.5," Updated Sep. 23, 2008 [retrieved on May 28, 2010], retrieved from http://www.docusign.com/preview/api/DocuSignPublisherGuide.pdf>. 9 pages.

(Continued)

*Primary Examiner* — Moustafa M Meky
(74) *Attorney, Agent, or Firm* — Lowe Graham Jones PLLC

(57) ABSTRACT

The present invention provides systems and methods for dynamically rendering documents during a signing ceremony (instead of validating that signature tasks are placed appropriately on all documents). The invention establishes a visibility policy that governs how documents are rendered, based on the state of system Tabs (instructions) placed on the documents.

15 Claims, 3 Drawing Sheets

U.S. PATENT DOCUMENTS

| | | |
|---|---|---|
| 6,615,348 B1 | 9/2003 | Gibbs |
| 6,658,403 B1 | 12/2003 | Kuroda et al. |
| 6,671,805 B1 | 12/2003 | Brown et al. |
| 6,751,632 B1 | 6/2004 | Petrogiannis |
| 6,796,489 B2 | 9/2004 | Slater et al. |
| 6,807,633 B1 | 10/2004 | Pavlik |
| 6,912,660 B1 | 6/2005 | Petrogiannis |
| 6,931,420 B1 | 8/2005 | Silvester et al. |
| 6,938,157 B2 | 8/2005 | Kaplan |
| 6,944,648 B2 | 9/2005 | Cochran et al. |
| 6,947,911 B1 | 9/2005 | Moritsu et al. |
| 6,961,854 B2 | 11/2005 | Serret-Avila et al. |
| 7,069,443 B2 | 6/2006 | Berringer et al. |
| 7,100,045 B2 | 8/2006 | Yamada et al. |
| 7,162,635 B2 | 1/2007 | Bisbee et al. |
| 7,237,114 B1* | 6/2007 | Rosenberg ............... 713/176 |
| 7,340,608 B2 | 3/2008 | Laurie et al. |
| 7,360,079 B2 | 4/2008 | Wall |
| 7,395,436 B1 | 7/2008 | Nemovicher |
| 7,523,315 B2* | 4/2009 | Hougaard et al. ........... 713/176 |
| 7,533,268 B1 | 5/2009 | Catorcini et al. |
| 7,554,576 B2* | 6/2009 | Erol et al. ................ 348/211.3 |
| 7,562,053 B2 | 7/2009 | Twining et al. |
| 7,568,101 B1 | 7/2009 | Catorcini et al. |
| 7,568,104 B2 | 7/2009 | Berryman et al. |
| 7,581,105 B2 | 8/2009 | Dietl |
| 2002/0019937 A1 | 2/2002 | Edstrom et al. |
| 2003/0078880 A1* | 4/2003 | Alley et al. .................. 705/38 |
| 2004/0133493 A1* | 7/2004 | Ford et al. ................... 705/35 |
| 2004/0225884 A1 | 11/2004 | Lorenzini et al. |
| 2004/0250070 A1* | 12/2004 | Wong ......................... 713/170 |
| 2006/0205476 A1 | 9/2006 | Jubinville |
| 2006/0261545 A1 | 11/2006 | Rogers |
| 2007/0026927 A1 | 2/2007 | Yaldoo et al. |
| 2008/0034213 A1 | 2/2008 | Boemker et al. |
| 2008/0097777 A1* | 4/2008 | Rielo .............................. 705/1 |
| 2008/0209313 A1 | 8/2008 | Gonser |
| 2009/0024912 A1 | 1/2009 | McCabe et al. |
| 2009/0025087 A1 | 1/2009 | Peirson, Jr. et al. |
| 2009/0292786 A1 | 11/2009 | McCabe et al. |

OTHER PUBLICATIONS

Nilsson, "eLynx Adds Workflow Management to Electronic Document Platform New Workflow Capabilities Provide for Enhanced Electronic Loan Processing," Press release dated Jan. 20, 2009 [retrieved on May 28, 2010], retrieved from http://www.elynx.com/news/view/82>. 2 pages.

Wheeler, "DocuSign Unveils New Scalable Product and Support Offerings for Electronic Signature and Electronic Contract Execution," Press release dated Jan. 28, 2009 [retrieved on May 28, 2010], retrieved from http://www.docusign.com/news_and_events/press_releases/2009-01-28.php>. 2 pages.

* cited by examiner

SYSTEMS AND METHODS FOR DOCUMENT MANAGEMENT TRANSFORMATION AND SECURITY

PRIORITY CLAIM

This application claims the benefit of U.S. Provisional Application Ser. No. 61/160,237 filed Mar. 13, 2009; contents of which are incorporated herein.

BACKGROUND OF THE INVENTION

Today, there is no programmatic way to ensure the contract signing process happens in any particular controllable fashion. Contracts are printed out and physically distributed. Signers sign where they see fit, and may or may not complete the signing correctly. Contract pages may be lost or not returned to the proper person. Using electronic systems, contracts can be routed using workflow, but these systems are complicated, hard to setup and manage, and usually do not involve the end-user signing process. The existence of a variety of pre-established document formats requires dynamic evaluation and verification of documents for signature. In addition, there is no system to readily restrict access of documents for signature to only those parties that are authorized to review and execute.

SUMMARY OF THE INVENTION

The present invention provides systems and methods for dynamically rendering documents during a signing ceremony (instead of validating that signature tasks are placed appropriately on all documents). The invention establishes a visibility policy that governs how documents are rendered, based on the state of system Tabs (instructions) placed on the documents.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
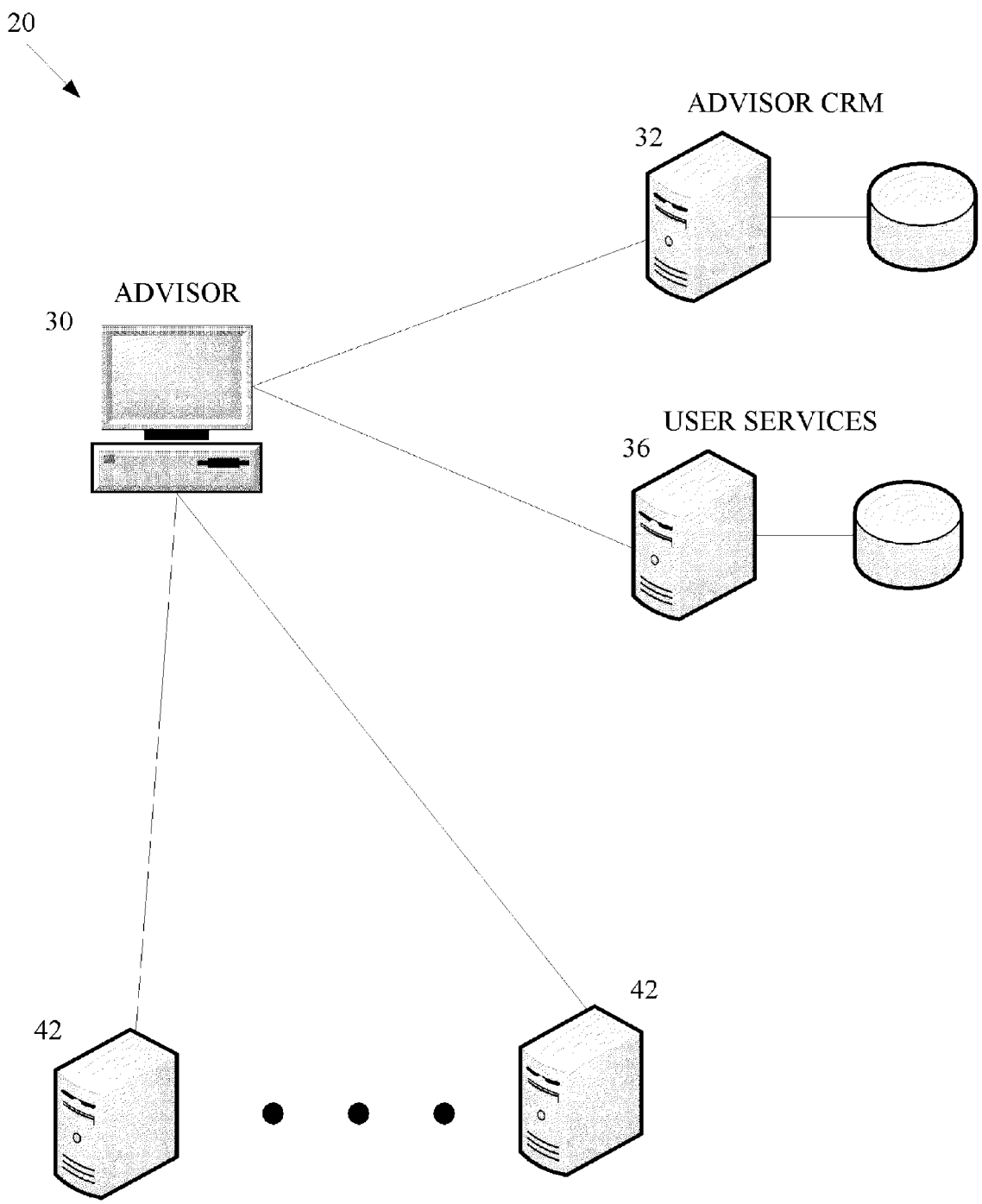
FIG. 1 is a schematic diagram of an example system formed in accordance with the present invention.

The present invention provides enhanced document management systems and methods for evaluating and transforming portable document format (PDF) documents and security restrictions on electronic document review and execution. FIG. 1 illustrates an example system 20 having an advisor computer system 30, an advisor Customer Relationship Management (CRM) server 32, a user services server 36 and a plurality of user systems 42.

Figure 2:
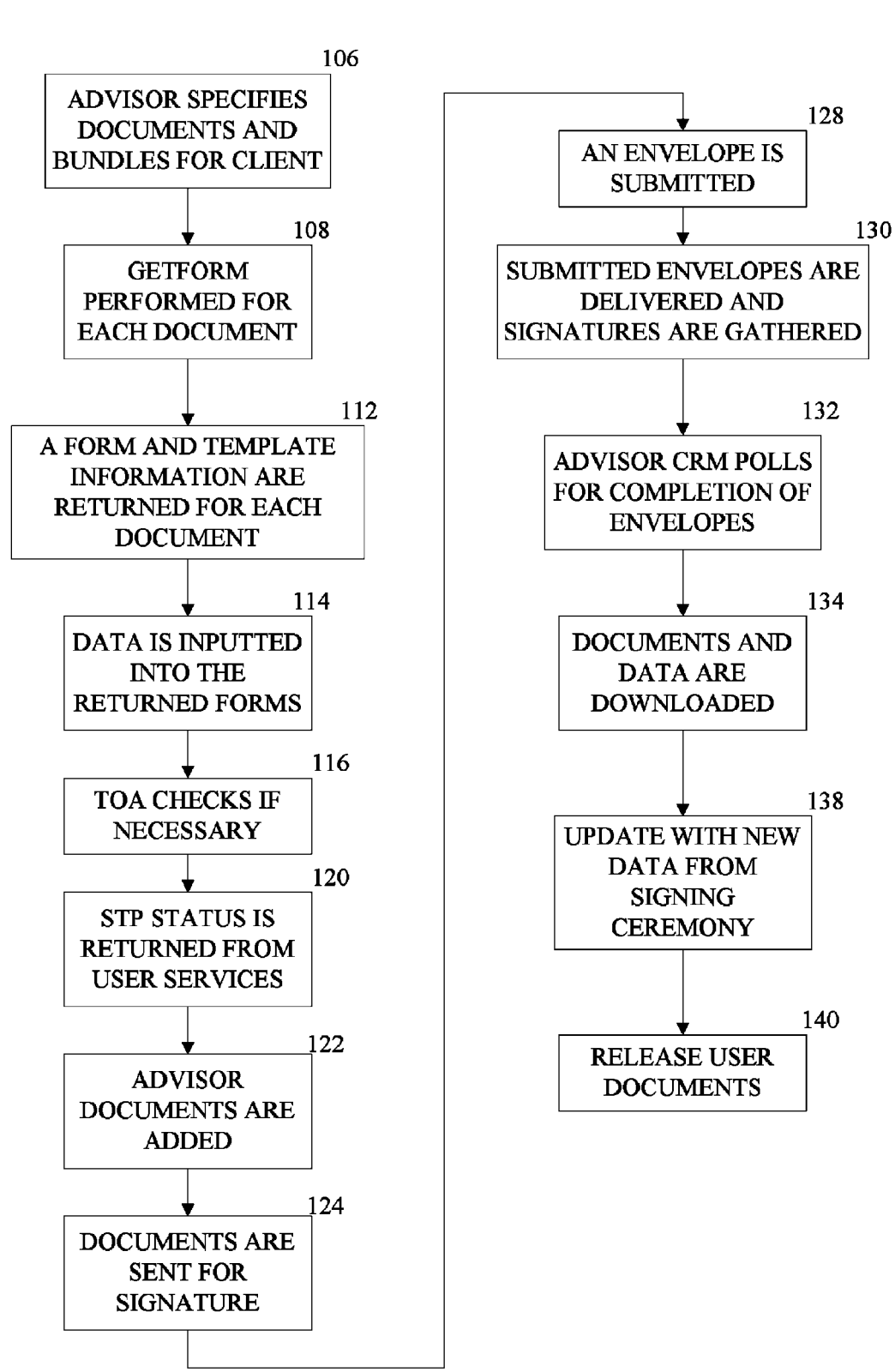
FIG. 2 is a flow diagram of an example process performed by the system shown in FIG. 1.
Figure 3:
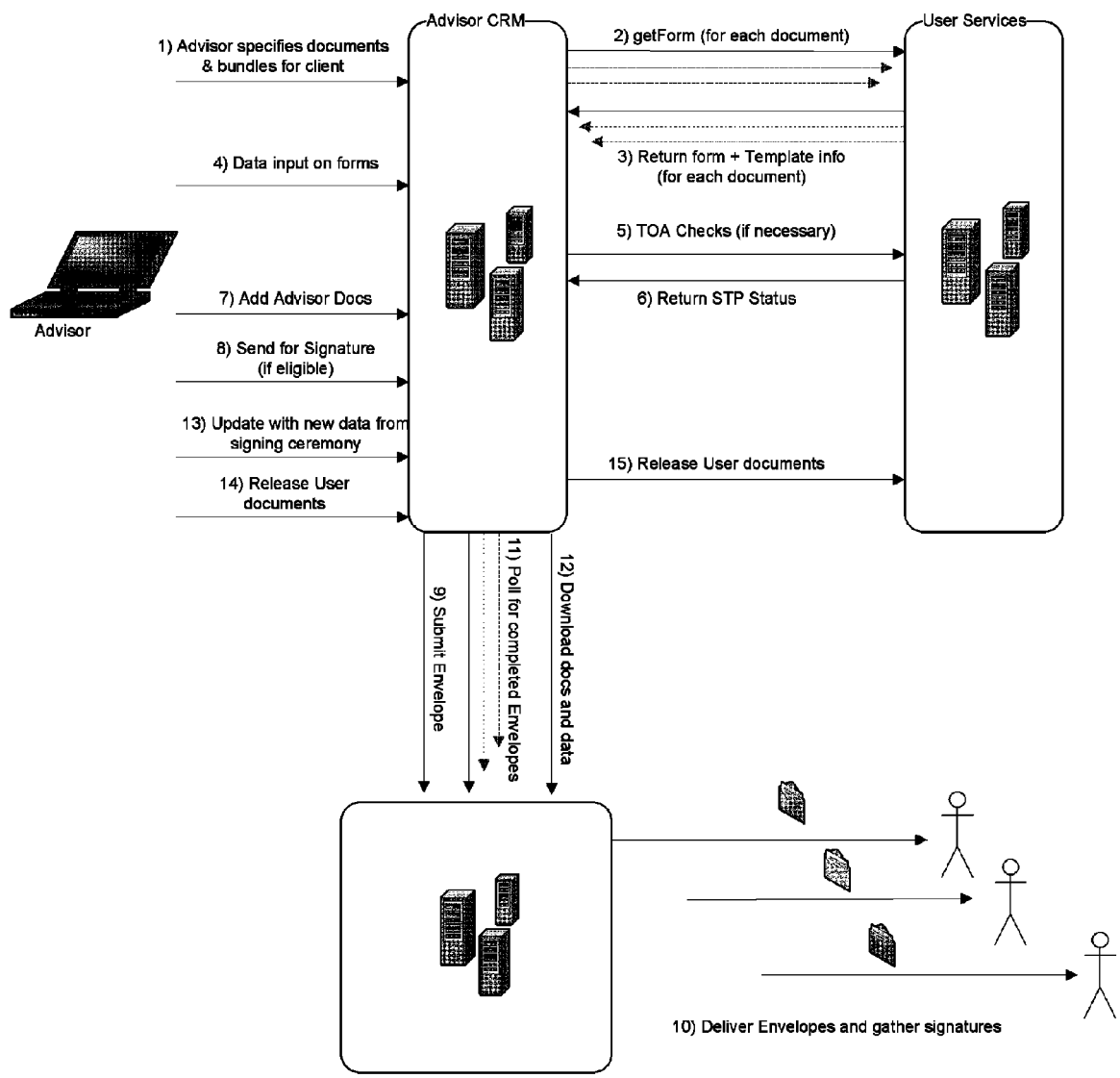
FIG. 3 is a combined flow and system diagram.

FIG. 2 illustrates an example transform process performed by the system 20. FIG. 3 illustrates a combined system/process diagram.

PDF Document Transformation

The evaluation and transformation of PDF documents include both input and output transformations. For Static Extensible Markup Language (XML) Forms Architecture (XFA) forms and AcroForms (aka Acrobat Forms), the system 20 correlates the form fields from an input form to fields in a system template. The form field data and attributes are then reflected in a system signing ceremony in accordance with the rules defined in a system template (e.g., Editable vs. Read-Only, Required vs. Optional, Assignment to individual Recipients, placement on the signed document, etc.) One function that this process enables is for the system 20 to render data that was collected from a sender-provided input form to signing parties in an editable format. Without this transformation process, all form data from input forms is imposed on the documents in a non-editable format during the signing ceremony.

The following items are currently transferred from the input PDF into the system process:
Field data
On/Off values for Radio Buttons (Distinct from Display Values)

The following items are currently specified in the template, but may alternatively be included as optional characteristics or extensions of the transform process:
Field placement
Field rules
   Optional vs. Required
   Editable vs. Read-only
   Edit masks
List items in drop-down fields
Display value vs. Stored value for drop-down fields
Signature fields The following items are currently transferred from the output PDF into the system process. The system provides the form data that is collected during the signing ceremony in the same (XML) structure that it came in. This allows the systems that consume system data (post-execution) to process the data as if it was extracted from the forms that they provided to the system.

Document Security Restrictions

Business rules currently enforced through validation by the system ensures the following behaviors:

If any Recipient has a signature/initial task on a document, every Recipient must have a signature/initial task on the document. If there is an Envelope Recipient without a signature/initial task on a document that contains some signature/initial task, system will reject the Envelope upon creation.

If a document does not have any signature/initial tasks for any Envelope Recipient, the document is perceived to be viewable by all Recipients, and the Envelope is allowed to be created.

The present invention dynamically renders the documents during a signing ceremony (instead of validating that signature tasks are placed appropriately on all documents). The invention establishes a visibility policy that governs how documents are rendered, based on the state of system Tabs (instructions) placed on the documents contained within the Envelope. Preferably, the system behavior is as follows:

If a document has a system Tab for a Recipient, the document will be visible for the Recipient.

If a document has a system Tab for one Recipient but not another, the document will not be visible to the Recipient that lacks the system Tab.

If the document does not have any system Tabs, the document will be visible to all Recipients.

If a Recipient chooses to download a copy of their documents through the system web interface, only the documents that were viewable during the signing ceremony will be downloaded.

Predetermined CertifiedDelivery and CarbonCopy Recipients will see all documents in the Envelope.

The system preferably allows the following additional configuration options:

Dynamically suppress access to the Certificate of Completion and Envelope History for all Signers, Certified Delivery, and Carbon Copy Recipients. (These documents/screens display a list of all signers).

Ability to specify system behavior as an Account-level setting or on an Envelope-basis. In one embodiment, the setting is not available for Account Administrators to manage; i.e., the Account-level setting could be specified for system users who would themselves not have the ability to change the setting.

Ability to reflect in the Envelope History the system visibility setting. This information is available for human readability as well as programmatic access.

Ability to make all documents visible to the Envelope Sender.

Ability to designate whether Members of the sending Account can see all documents, or whether they are subject to the visibility policy.

The invention methodology is better understood by reference to the following example. In this scenario, there are two signers, S1 and S2, and four documents subject to the system process, D1, D2, D3 and D4. S1 is asked to sign D1 and D2. S2 is asked to sign D1 and enter data on D4. The resulting behavior in this scenario, according to one embodiment of the present invention, is that S1 will see documents D1, D2 and D3, while S2 will see documents D1, D3 and D4.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method in a server computer connected to a recipient computer system via a network connection, the method comprising:
   establishing a visibility policy that governs access to electronic documents associated with a signing ceremony, by:
      allowing a recipient to view an electronic document, if the document includes an instruction for that recipient to view the electronic document;
      allowing all recipients to view an electronic document, if the document does not include any viewing instructions;
   receiving at the server computer a request from a recipient to download a copy of the electronic documents associated with the recipient; and
   downloading to the recipient computer system only electronic documents that were identified as viewable during the signing ceremony.

2. The method of claim 1, further comprising disallowing a first recipient to view an electronic document, if the document includes an instruction for a second recipient to view the document but does not include an instruction for the first recipient to view the document.

3. The method of claim 1, further comprising rejecting creation of an envelope for an electronic document that contains a signature/initial task for a first recipient, if the envelope includes a second recipient without a signature/initial task on the document.

4. The method of claim 1, further comprising allowing creation of an envelope for an electronic document, if the document does not contain any signature/initial tasks for any recipients.

5. The method of claim 1, further comprising allowing predetermined certified delivery recipients and/or carbon copy recipients to view all electronic documents in an envelope.

6. The method of claim 1, further comprising dynamically suppressing access to a certificate of completion and/or envelope history for one or more of: document signers, certified delivery recipients, and carbon copy recipients.

7. The method of claim 1, further comprising allowing a sender of an envelope to view all documents in the envelope.

8. The method of claim 1, further comprising designating whether all members of a sending account can view all of the electronic documents associated with the signing ceremony or whether the members of the sending account are subject to the visibility policy.

9. The method of claim 1, wherein establishing the visibility policy is based on tabs placed on the electronic documents associated with the signing ceremony.

10. The method of claim 9, wherein the electronic documents associated with the signing ceremony are represented in portable document format.

11. The method of claim 1, wherein downloading to the recipient computer system only electronic documents that were identified as viewable during the signing ceremony includes downloading the electronic documents via a web interface.

12. A system comprising:
   a server computer connected to a recipient computer system via a network connection, the server computer configured to establish a visibility policy that governs access to electronic documents associated with a signing ceremony, by:
      allowing a recipient to view an electronic document, if the document includes an instruction for that recipient to view the electronic document;
      allowing all recipients to view an electronic document, if the document does not include any viewing instructions;
      receiving at the server computer a request from a recipient to download a copy of the electronic documents associated with the recipient; and
      downloading to the recipient computer system only electronic documents that were identified as viewable during the signing ceremony.

13. The system of claim 12, wherein the server computer is further configured to:
   reject creation of an envelope for an electronic document that contains a signature/initial task for a first recipient, if the envelope includes a second recipient without a signature/initial task on the document; and
   allow creation of an envelope for an electronic document, if the document does not contain any signature/initial tasks for any recipients.

14. The system of claim 12, wherein the server computer is further configured to based on the visibility policy, suppress access to a certificate of completion and/or envelope history for one or more of: document signers, certified delivery recipients, and carbon copy recipients.

15. The system of claim 12, wherein the server computer includes a web interface for downloading the electronic documents associated with a signing ceremony, wherein the electronic documents associated with the signing ceremony are represented in portable document format, and wherein the visibility policy is based on tabs placed on the electronic documents associated with the signing ceremony.

* * * * *